(12) United States Patent
Hill et al.

(10) Patent No.: US 10,668,555 B2
(45) Date of Patent: Jun. 2, 2020

(54) ALUMINUM SPOT WELDING METHOD

(71) Applicant: MAGNA INTERNATIONAL INC., Aurora (CA)

(72) Inventors: John Edward Hill, Shelby Township, MI (US); Terence Anthony Devers, London (CA)

(73) Assignee: MAGNA INTERNATIONAL INC., Aurora (CA)

( * ) Notice: Subject to any disclaimer, the term of this patent is extended or adjusted under 35 U.S.C. 154(b) by 1197 days.

(21) Appl. No.: 14/787,970

(22) PCT Filed: May 1, 2014

(86) PCT No.: PCT/US2014/036333
§ 371 (c)(1),
(2) Date: Oct. 29, 2015

(87) PCT Pub. No.: WO2014/179547
PCT Pub. Date: Nov. 6, 2014

(65) Prior Publication Data
US 2016/0089745 A1   Mar. 31, 2016

Related U.S. Application Data

(60) Provisional application No. 61/819,182, filed on May 3, 2013.

(51) Int. Cl.
*B23K 11/11* (2006.01)
*B32B 15/01* (2006.01)
(Continued)

(52) U.S. Cl.
CPC .............. *B23K 11/115* (2013.01); *B23K 11/04* (2013.01); *B23K 11/24* (2013.01);
(Continued)

(58) Field of Classification Search
CPC ......... B23K 11/04; B23K 11/11; B23K 11/24; B23K 11/115; B23K 11/3009;
(Continued)

(56) References Cited

U.S. PATENT DOCUMENTS 2,016,866 A * 10/1935 Lurie ..................... F23D 14/40
239/488
5,047,608 A     9/1991 Takahashi et al.
(Continued)

FOREIGN PATENT DOCUMENTS

| CN | 101267908 A | 9/2008 |
| JP | H0957460 A  | 3/1997 |

(Continued)

*Primary Examiner* — Jonathan P Masinick
(74) *Attorney, Agent, or Firm* — Dickinson Wright PLLC

(57) ABSTRACT

A welding tip (20) for spot welding a first part (22) formed of conductive metal, for example aluminum, to a second part (24) formed of aluminum or another conductive metal, such as steel, is provided. The welding tip (20) includes a notch (30) at a distal end (38) and a convex contact surface (28) extending radially outwardly and upwardly from the notch (30) for engaging a surface of the first part (22). The rotating welding tip (20) forms a depression (32) on the surface of the first part (22) during the welding process. The notch (30) creates a pin (34) in the center of the depression (32) which provides a fixed axis of rotation for the rotating welding tip (20) and prevents the welding tip (20) from moving radially relative to the fixed axis, thereby improving the quality of the final spot weld (36) and reducing process time.

10 Claims, 4 Drawing Sheets

(51) Int. Cl.
*B23K 35/02* (2006.01)
*B23K 11/30* (2006.01)
*B23K 11/24* (2006.01)
*B23K 11/04* (2006.01)
*B23K 103/10* (2006.01)

(52) U.S. Cl.
CPC ...... *B23K 11/3009* (2013.01); *B23K 35/0255* (2013.01); *B32B 15/01* (2013.01); *B32B 15/016* (2013.01); *B23K 2103/10* (2018.08)

(58) Field of Classification Search
CPC ............ B23K 35/0255; B23K 2203/10; B32B 15/01; B32B 15/016
USPC ................... 403/270–272; 219/69.17, 117.1
See application file for complete search history.

(56) References Cited

U.S. PATENT DOCUMENTS

| | | | | |
|---|---|---|---|---|
| 5,266,776 | A * | 11/1993 | Boisvert | B23K 10/00 219/119 |
| 5,980,972 | A | 11/1999 | Ding | |
| 6,100,511 | A * | 8/2000 | Kempe | B23K 20/10 219/58 |
| 6,143,252 | A | 11/2000 | Hossainy et al. | |
| 7,091,440 | B2 | 8/2006 | Gabbianelli et al. | |
| 7,815,122 | B2 * | 10/2010 | Bauer | G06K 19/07749 219/117.1 |
| 7,828,357 | B2 * | 11/2010 | Hayashi | B23K 11/115 296/29 |
| 8,927,894 | B2 * | 1/2015 | Sigler | B23K 11/115 219/86.1 |
| 2002/0011509 | A1 * | 1/2002 | Nelson | B23K 20/122 228/112.1 |
| 2005/0061413 | A1 | 3/2005 | Chaylard | |
| 2006/0081563 | A1 * | 4/2006 | Ueda | B23K 11/30 219/119 |
| 2009/0218323 | A1 * | 9/2009 | Abe | B23K 11/258 219/86.25 |
| 2009/0255908 | A1 | 10/2009 | Sigler et al. | |
| 2010/0258536 | A1 | 10/2010 | Sigler et al. | |
| 2010/0282717 | A1 * | 11/2010 | Ananthanarayanan | B23K 11/258 219/108 |
| 2011/0266260 | A1 * | 11/2011 | Sigler | B23K 11/115 219/91.2 |
| 2013/0015164 | A1 * | 1/2013 | Sigler | B23K 11/115 219/87 |
| 2014/0076859 | A1 * | 3/2014 | Sigler | B23K 11/11 219/91.2 |

FOREIGN PATENT DOCUMENTS

| | | |
|---|---|---|
| JP | H10957640 A | 3/1997 |
| JP | H11342477 A | 12/1999 |
| JP | H051367 A | 2/2000 |
| JP | 2006130514 A | 5/2006 |
| JP | 2007130659 A | 5/2007 |
| JP | 2008093707 A | 4/2008 |
| JP | 2010131666 A | 6/2010 |
| JP | 2010192413 A | 9/2010 |
| WO | 0226271 A1 | 4/2002 |
| WO | 03095242 A1 | 11/2003 |

* cited by examiner

ALUMINUM SPOT WELDING METHOD

CROSS-REFERENCE TO RELATED APPLICATIONS

This U.S. National Stage Patent Application claims the benefit of PCT International Patent Application Ser. No. PCT/US2014/036333 filed May 1, 2014 entitled "Aluminum Spot Welding Method," which claims the benefit of U.S. Provisional Patent Application Ser. No. 61/819,182 filed May 3, 2013, entitled "Aluminum Spot Welding Method," the entire disclosures of the applications being considered part of the disclosure of this application and hereby incorporated by reference.

BACKGROUND OF THE INVENTION

1. Field of the Invention

The invention relates generally to spot welding methods, tools used for spot welding, and parts joined by spot welding.

2. Related Art

Spot welding is oftentimes used to join a first part formed of aluminum to a second part formed of aluminum or another metal material. The parts are held together under pressure by a pair of welding tips, which also function as electrodes. Current is supplied to the welding tips and concentrated in a single spot to melt the surface and form the weld. One drawback of spot welding aluminum parts is that aluminum oxides typically form along the surfaces, which reduces the integrity of the weld.

To break the oxide surface and reduce the amount of aluminum oxides formed during spot welding, the welding tips can present a spherical radius at their terminal end, and rotate continuously or intermittently at a controlled rate as they spot weld the parts together. An example of this technique was developed by KUKA and Mercedes-Benz® and is referred to as robo-spinning. The robo-spinning technique uses a robot to rotate the welding tips and spot weld the parts together. However, due to the significant force applied and the shape of the part being welded, the rotating weld tips tend to move out of position during the spot welding process. In addition, the terminal ends of the rotating welding tips can melt the surfaces of the parts and create locking divots.

SUMMARY OF THE INVENTION

The invention provides a welding tip for spot welding parts formed of conductive metal, such as aluminum. The welding tip comprises a shaft extending to a distal end and presenting a notch at the distal end. The shaft also includes a contact surface extending radially outwardly from the notch.

The invention also provides a method for spot welding. The method includes providing a first part formed of conductive metal and a second part formed of conductive metal. The method then includes contacting the first part with the welding tip while rotating the welding tip around its center axis.

The invention further provides a spot welded structure formed using the welding tip. The spot welded structure comprises the first part formed of conductive metal joined to the second part formed of conductive metal by a spot weld. The spot weld comprises a depression and a pin extending upwardly from the depression.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION

Figure 1:
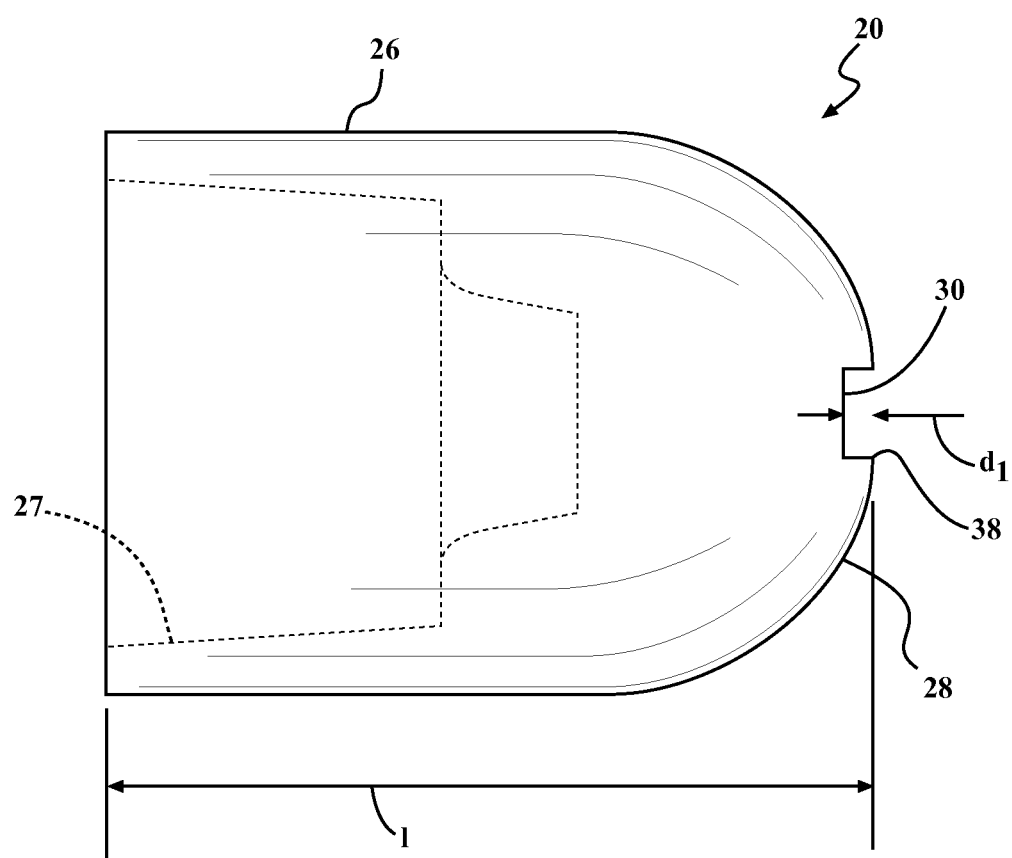
FIG. 1 is a side cross-sectional view of a welding tip according to an example embodiment of the invention.
Figure 2:
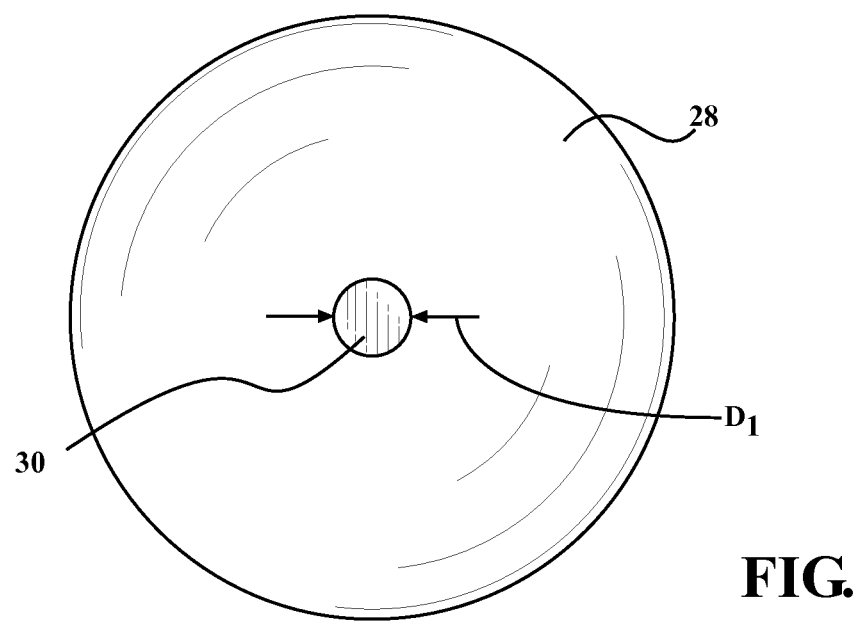
FIG. 2 is a bottom view of the welding tip of FIG. 1.

The invention provides a welding tip 20, as shown in FIGS. 1 and 2, for spot welding a first part 22 formed of conductive metal, typically aluminum, to a second part 24 formed of conductive metal, such as aluminum or another metal. The spot welding process is preferably a robo-spin or electromechanical motion spin process, for example the process illustrated in FIGS. 3 and 4, wherein the welding tip 20 rotates around its center axis A either continuously or intermittently. A high quality spot welded structure 25 including the first part 22 joined to the second part 24 by a spot weld 36, such as the structure 25 shown in FIGS. 5 and 6, can be formed by the method of the present invention. The welding tip 20 and method of the present invention can also avoid forming divots along the surface of the parts 22, 24, which are often formed by traditional spot welding tips. The welding tip 20 can also reduce the total spot welding process time. More specifically, the time it takes to fix the rotating welding tip 20 to one of the parts 22, 24 is reduced. In addition, the welding tip 20 requires less electrical current during the spot welding process, compared to a traditional welding tip.

The welding tip 20 may be formed of a copper alloy or another electrically conductive material so that when the welding tip 20 receives an electrical current the welding tip 20 functions as an electrode. The welding tip 20 of FIG. 1 is uncoated, but the welding tip 20 may alternatively be coated to reduce friction while rotating around its center axis A and thus experience less wear.

The welding tip 20 includes a shaft 26 which is typically disposed in a spot welding gun (not shown). The shaft 26 extends along the center axis A to a distal end 38 and includes a notch 30 at the distal end 38. A contact surface 28 surrounds the notch 30 at the distal end 38 for engaging the parts 22, 24 to be welded. As shown in FIGS. 1 and 2, the contact surface 28 extends radially outwardly and upwardly from the notch 30. The contact surface 28 also has a spherical radius which provides a rounded surface adjacent the distal end 38. In the example embodiment, the contact surface 28 presents a convex or semi-spherical shape. The area of the contact surface 28 and the size of the spherical radius can vary, depending on certain parameters, including, but not limited to, the thickness of the parts 22, 24 to be joined. Alternatively, other shapes may be used instead of the convex surface, depending on the desired formation of the spot weld 36 to be formed.

In the example embodiment of FIG. 1, the shaft 26 includes a slot 27 extending along the center axis A for receiving another component of the welding gun (not shown) which conveys the electrical current to the welding tip 20 during the welding process. The end of the slot 27 is spaced axially from the contact surface 28 of the spot welding tip 20.

The notch 30 of the welding tip 20, also referred to as a cavity, dimple, depression, or arbor, reduces the area of the surface in contact with one of the parts 22, 24. As a result, of the reduced area, the welding tip 20 requires less electrical current during the spot welding process, compared to a traditional welding tip. The notch 30 is preferably located at an apex of the convex contact surface 28 and extends inwardly along the center axis A away from the distal end 38, as shown in FIGS. 1 and 2. The cross-section of the notch 30 typically has a circular shape, as shown in FIG. 2, but can comprise other shapes. The diameter $D_1$ of the notch 30 can vary depending on the size of the contact surface 28 and the parts 22, 24 to be joined, or other factors. However, the cross-sectional area of the contact surface 28 surrounding the notch 30 is typically greater than the cross-sectional area of the notch 30, as shown in FIG. 2.

The depth $d_1$ of the notch 30 can also vary depending on the size of the shaft 26 and parts 22, 24 to be joined, or other factors. In the example embodiment of FIG. 1, the depth $d_1$ of the notch 30 is contained within the spherical portion of the welding tip 20 and is spaced from the slot 27 which receives the component of the welding gun. For example, the depth $d_1$ of the notch 30 could be less than 30 percent (%), or less than 20%, or less than 10%, or less than 5% of the distance between the distal end 38 of the welding tip 20 and the slot 27 for receiving the welding gun. The depth $d_1$ of the notch 30 could also be less than 10%, or less than 5%, or less than 1% of the total length 1 of the welding tip 20.

During the spot welding process, the contact surface 28 of the rotating welding tip 20 forms a depression 32 on the surface of one of the parts 22, 24 to be joined. As the contact surface 28 forms the depression 32, the notch 30 creates a pin 34 extending upwardly from the center of the depression 32. The notch 30 fixes or secures the welding tip 20 to the surface of one of the parts 22, 24, and the pin 34 provides a fixed axis of rotation for the welding tip 20. The pin 34 also prevents the welding tip 20 from moving radially relative to the center axis A while rotating around the center axis A. The notch 30 also allows for precise location of applied force and electrical current which further prevents the rotating welding tip 20 from moving out of position. As alluded to above, the notched welding tip 20 has much higher electrode force density and requires less initial electrical current during the welding process—compared to a traditional welding tip, since the contact surface 28 is reduced. The depression 32 and pin 34 remain on the final spot welded structure 25 as a witness to the process quality. It can be measured as a quality indicator relating to roundness in shape and surface indentation depth.

Figure 3:
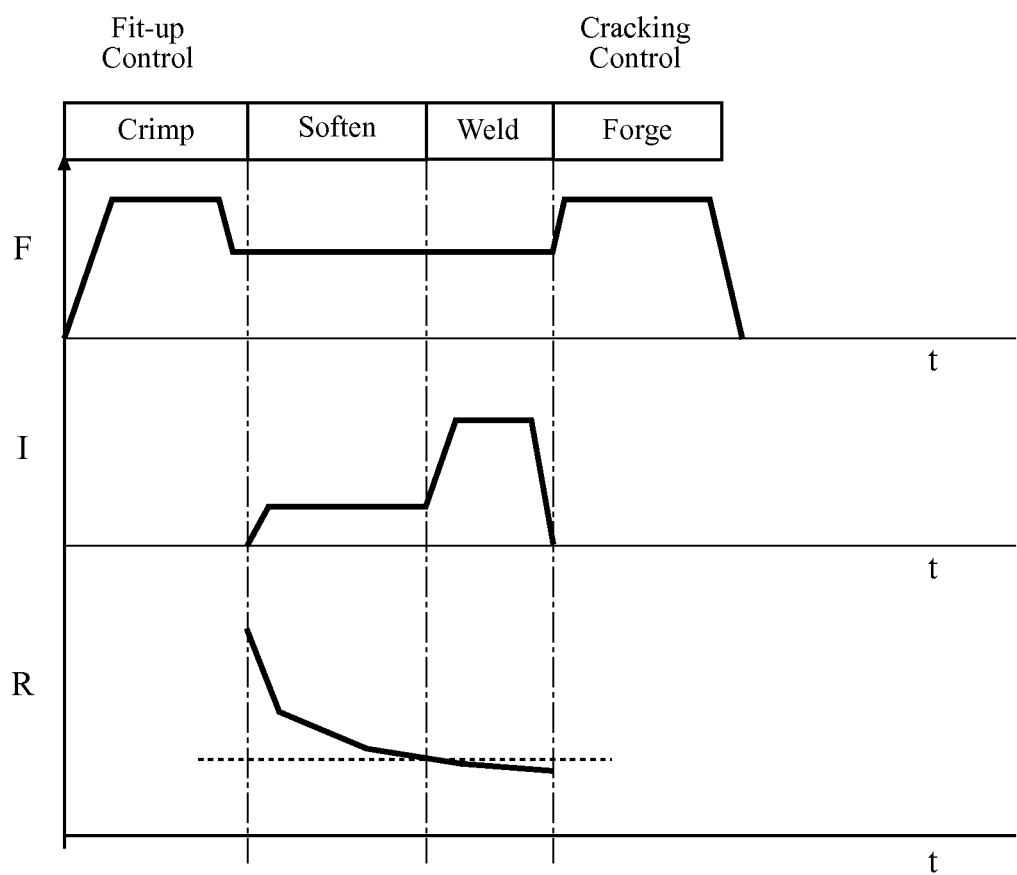
FIG. 3 is a chart illustrating phases of a spot welding process according to an example embodiment.

The invention also provides a method for joining the first part 22 formed of conductive metal to the second part 24 formed of conductive material by a spot welding method using the notched welding tip 20 and thus forming the spot welded structure 25. The method preferably includes the robo-spinning technique, but can comprise another method that involves rotating the welding tip 20 around its center axis A, either continuously or intermittently. FIG. 3 illustrates phases of an example method used to spot weld the parts 22, 24, including the degree of force F, electrical current I, and electrical resistance R applied during each phase of the spot welding process.

The method begins by providing the first part 22 and the second part 24 to be welded. The first part 22 is formed of conductive metal, such as aluminum, and the second part 24 is also formed of conductive metal, which is typically aluminum, but may be another conductive metal, such as steel. The size and shape of the parts 22, 24 can vary depending on the intended application of the finished spot welded structure 25. For example, the parts 22, 24 can be designed for use as a component of an automotive vehicle. In addition, the parts 22, 24 can be pre-conditioned in any manner know in the art to improve the integrity of the spot weld 36 ultimately joining the parts 22, 24. The conductive metal of the parts 22, 24 can also be coated or uncoated. Coating thicknesses are becoming increasingly thicker to cope with corrosion issues. Example coatings include aluminum, zinc, and combinations of alloys to protect the conductive metal from corrosion.

Figure 4:
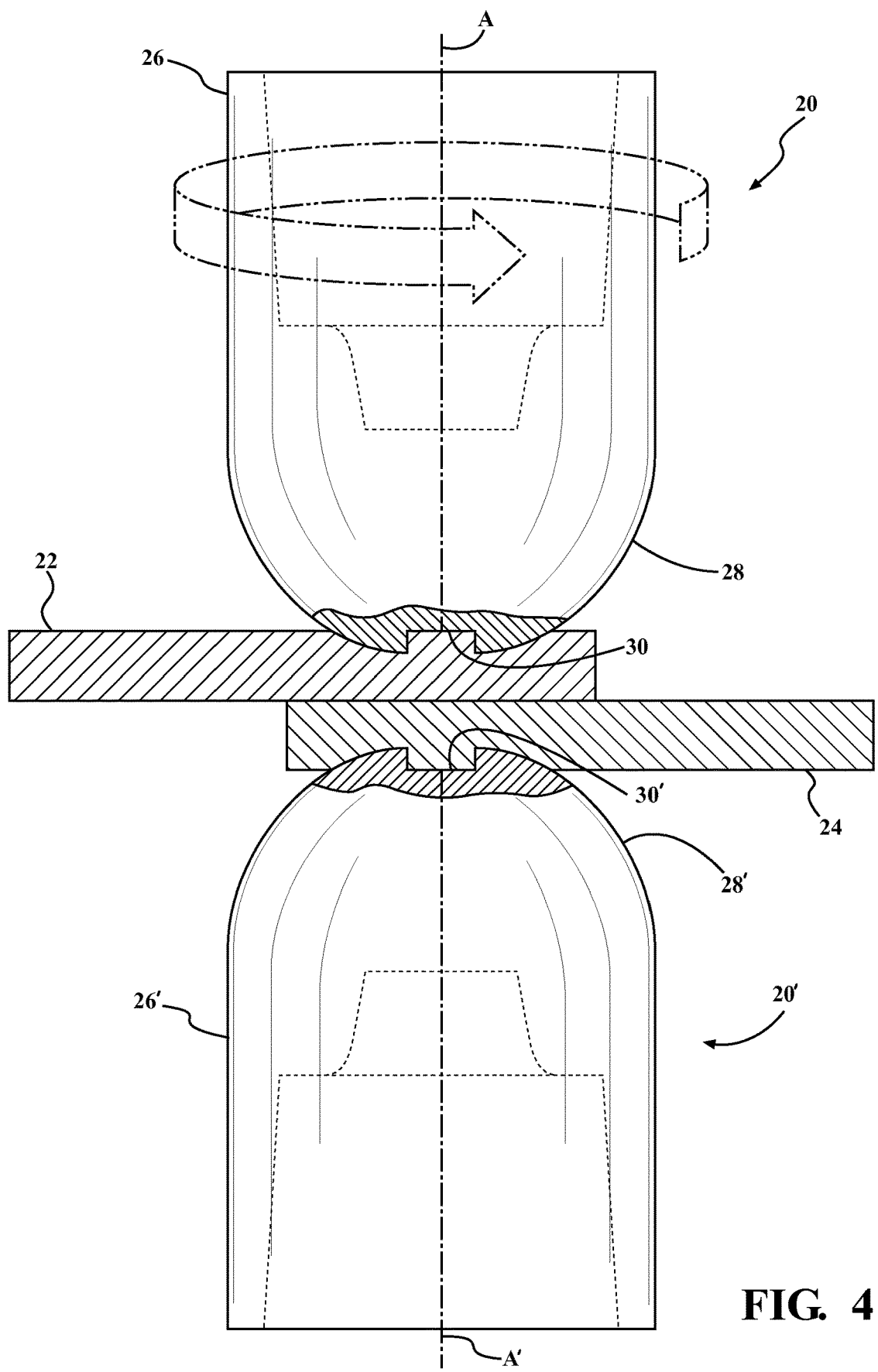
FIG. 4 illustrates a pair of welding tips spot welding a first part to a second part according to an example embodiment.

Typically, the method employs two of the notched welding tips 20, including the first welding tip 20 and a second welding tip 20', as shown in FIG. 4. A pair of welding guns (not shown) each including one of the notched welding tips 20, 20' are used to spot weld 36 the parts 22, 24. As shown in FIG. 4, the first and second welding tips 20, 20' are aligned on opposite sides of the parts 22, 24 to be joined. The welding tips 20, 20' preferably have the same design and perform the same function at the same time. For example, the first welding tip 20 engages the first part 22 while the second welding tip 20' engages the second part 24, or vice versa. Accordingly, although the following description refers to only the first welding tip 20 and the first part 22 in several instances, the description also applies to the second welding tip 20' and the second part 24.

The method begins with a first phase including supplying power to the welding gun, which drives the welding tip 20 to rotate around its center axis A, preferably before contacting the part 22. In the example embodiment, the rotating step begins before the welding tip 20 contacts the surface of the part 22 in order to reduce process time. The first phase of the example spot welding process also includes crimping the parts 22, 24 before any electrical current I or heat is applied to the welding tips 20, 20' or the parts 22, 24. This cold crimping first phase can be applied in any situation, but is typically applied when a gap between the parts 22, 24 is present, for example, due to manufacturing tolerances. The first phase comprises a first period of time at the start of the welding process, during which the rotating welding tips 20, 20' first contact a spot along the surface of each of the parts 22, 24. As shown in FIG. 3, no electrical current I is applied to the welding tips 20, 20' during the first phase. Once the rotating welding tips 20, 20' contact the parts 22, 24, the first phase includes applying a significant force F to the parts 22, 24 by the welding tips 20, 20'. The center axis A of the first welding tip 20 is aligned with the center axis A' of the second welding tip 20', as shown in FIG. 4, as the welding tips 20, 20' rotate.

The welding tip 20 can rotate continuously or intermittently during the first phase. As the rotating welding tip 20 develops force, any oxide layer present on the surface of the part 22 is removed. The rotating welding tip 20 can also score, remove, condition, or scrub any coating on the surface of the part 22. At the end of the first phase, the force F applied to the welding tip 20 is typically reduced in preparation for the second phase.

The second phase of the example method shown in FIG. 3 includes softening the part 22. During the second phase, which is a second period of time immediately following the first period of time, the force F is still applied to the rotating welding tip 20 at a constant level. The electrical current I is then turned on and applied to the welding tip 20 in order to soften the part 22. FIG. 3 shows that the electrical current I initially increases and then stays at a constant level throughout the second phase, while the electrical resistance R is highest at the beginning of the second phase and decreases continuously throughout the second phase.

The temperature of the part 22 also increases during the second phase as the welding tip 20 continues to rotate while in contact with the part 22. Thus, the spot along the surface of the part 22 engaged by the rotating welding tip 20 begins to melt, and the welding tip 20 begins forming the depression 32 and the pin 34 extending upwardly from the center of the depression 32. Once the pin 34 forms, the welding tip 20 rotates about the pin 34. The notch 30 and pin 34 fix the axis of rotation at the center axis A of the welding tip 20 and prevent the welding tip 20 from moving radially relative to the center axis A during the rotating step. In other words, the notch 30 and pin 34 fix or secure the welding tip 20 to the part 22 and prevent the welding tip 20 from moving or shifting radially relative to its center axis A during the rotating step of the second phase.

The welding tip 20 can rotate continuously or intermittently during the second phase. In either case, the welding tip 20 rotates quickly enough to prevent the melted aluminum or other conductive metal of the part 22 from sticking to the contact surface 28 or notch 30 of the welding tip 20. The lack of oxides on the surface of the part 22 also prevents the melted metal from sticking. Thus, the service life of the welding tip 22 is improved.

The third phase of the example method shown in FIG. 3 is the welding phase. During the third phase, which is a third period of time immediately following the second period of time, the force F is maintained at the same level as in the second softening phase. However, the electrical current I increases sharply to its highest level and stays at that level during the majority of the third phase, while the electrical resistance R continues to slowly decrease. As the welding tip 20 continues rotating, the temperature continues to increase and the spot along the surface of the part 22 continues to melt. During the third phase, the notch 30 continues to fix the welding tip 20 to the surface of the part 22, while the pin 34 provides the fixed center axis A of rotation for the rotating welding tip 20. Thus, the notch 30 allows for precise location of the applied force F and electrical current I, which leads to a higher quality spot weld 36 in the finished structure 25. The notch 30 also continues to prevent the welding tip 20 from moving, sliding, or skidding out of position. Towards the end of the third phase, the spot weld 36, also referred to as a weld nugget is typically formed between the two parts 22, 24. At the end of the third phase, the electrical current I is sharply reduced to zero, the electrical resistance R is gradually reduced to zero, and the temperature of the welding tip 20 and the part 22 begins to decrease. Thus, the part 22 begins to cool at the end of the third phase and after the third phase.

In the example embodiment shown in FIG. 3, the fourth phase includes forging. The forging is beneficial to reduce cracking along the surface of the part 22, especially when the part 22 is formed of an alloy, but the forging step is not required. During the optional fourth phase, which is a fourth period of time immediately following the third period of time, the electrical current I is turned off, and the welding tip 20 and part 22 continue to cool. The force F applied to the part 22 by the welding tip 20 during the fourth phase increases relative to the second and third phases. The force F applied during the fourth phase is approximately equal to, or at least equal to the force F applied during the first phase, and the force F remains at this high level for a majority of the fourth phase. A high capacity welding gun may be required to achieve this high level of force F during the first and fourth phases. In addition, the welding tip 20 can optionally rotate during the fourth phase.

The welding tip 20 typically stops rotating continuously around its center axis A at some point after the third phase. If the method includes the optional fourth phase, then the welding tip 20 stops rotating continuously before, during, or after the fourth phase. A cooling phase (not shown in FIG. 3) then begins either after the third phase or after the optional fourth phase, wherein the depressions 32 and pin 30 formed by the welding tip 20 can solidify and provide the finished spot weld 36 joining the first part 22 and the second part 24. At the beginning of the cooling phase, the welding tip 20 is still in contact with the part 22, and the method preferably includes "swiveling" or rotating the welding tip 20 less than 360 degrees around its center axis A in a first direction, and preferably followed by rotating the welding tip 20 less than 360 degrees around its center axis A in a second direction opposite the first direction. For example, the swiveling step can include rotating 10 degrees in one direction, or rotating 5 degrees clockwise followed by 5 degrees counterclockwise. This swiveling step further prevents the aluminum or other conductive metal from sticking to the welding tip 20. The swiveling motion can be repeated a plurality of times, either continuously or intermittently. The swiveling step can also be incorporated into other phases of the spot welding process. The pin 34 formed on the surface of the part 22 remains disposed in the notch 30 of the welding tip 20 during the swiveling step and keeps the welding tip 20 in position during the swiveling step.

Figure 5:
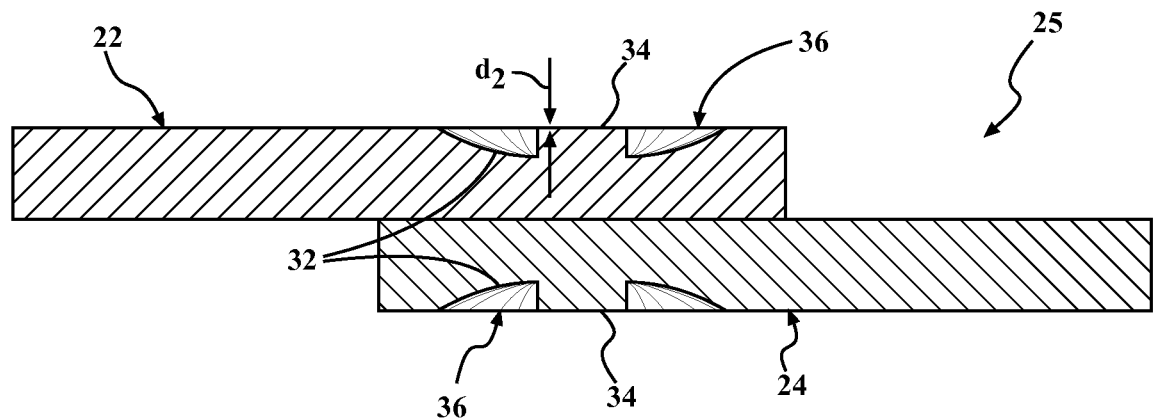
FIG. 5 illustrates a structure including a first part spot welded to a second part according to an example embodiment.
Figure 6:
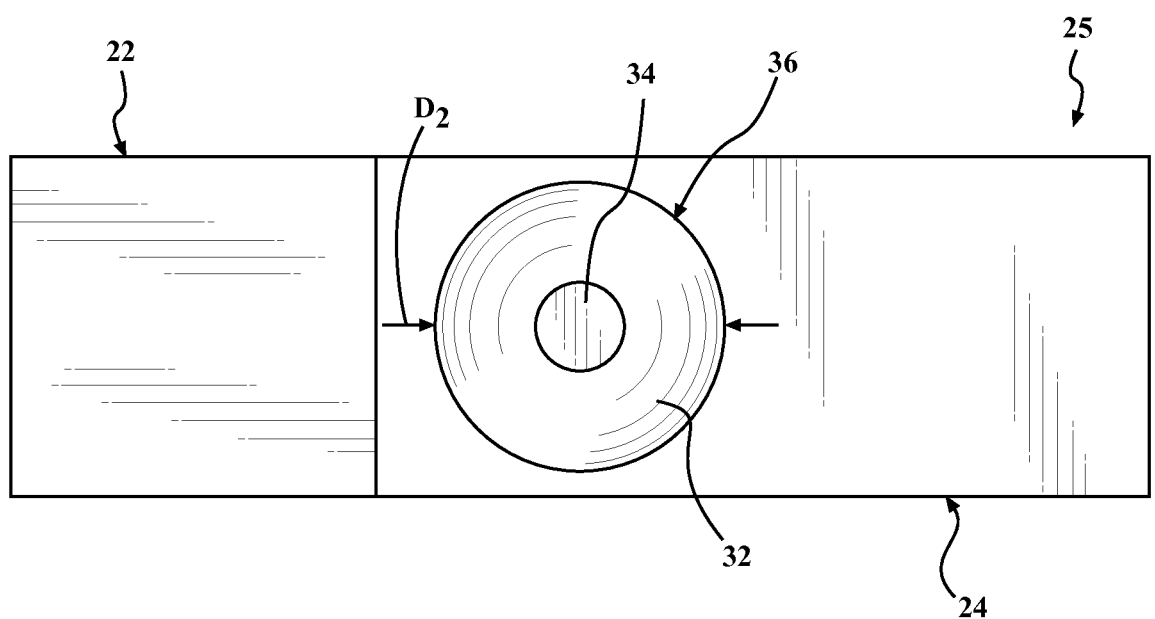
FIG. 6 shows the top and bottom of the spot welded structure of FIG. 5.

The invention further provides a structure 25 including the first part 22 formed of aluminum and the second part 24 formed of aluminum or another metal material joined together by the spot weld 36, as shown in FIGS. 5 and 6. The spot weld 36 comprises the depression 32 on the surface of each part 22, 24, and the pin 34 extending upwardly from the center of each depression 32. The depression 32 typically presents a concave surface and the pin 34 extends upwardly from the center of the concave surface. The pin 34 formed in the first part 22 is preferably aligned with the pin 34 formed in the second part 24. The pin 34 makes it easy to identify spot welded structures 25 formed using the notched welding tip 20 of the present invention. The depth $d_2$ and diameter $D_2$ of each depression 32 can vary, depending on the size of the welding tip 20 and the pressures and temperatures of the spot welding process. However, the total cross-sectional area of each depression 32 is typically greater than the total cross-sectional area of each pin 34, as shown in FIG. 5. The spot weld 36 formed using the notched welding tip 20 is higher quality than spot welds formed using other welding tips without the notch 30.

Obviously, many modifications and variations of the present invention are possible in light of the above teachings and may be practiced otherwise than as specifically described while within the scope of the claims.

The invention claimed is:

1. A method for spot welding parts formed of conductive metal, comprising the steps of:
  providing a first part formed of conductive metal and a second part formed of conductive metal;
  contacting the first part with a first welding tip while rotating the first welding tip around a center axis of the first welding tip, the first welding tip including a shaft extending to a distal end and presenting a notch at the distal end, and the shaft including a contact surface extending radially outwardly from the notch;

applying no current to the first welding tip for a first period of time;

rotating the first welding tip before contacting the first part with the first welding tip during the first period of time; and applying force to the first part by the first welding tip during the first period of time;

contacting a spot on the first part during the first period of time and during a second period of time immediately following the first period of time;

applying electrical current to the first welding tip during the second period of time;

melting the first part in the spot during the second period of time;

decreasing the force applied to the first part by the first welding tip during the second period of time;

contacting the spot on the first part during a third period of time immediately following the second period of time;

increasing the electrical current applied to the first welding tip while rotating the first welding tip during the third period of time;

the rotating steps including continuously or intermittently rotating the first welding tip around the center axis of the first welding tip and forming a depression in the first part and a pin extending upwardly from the depression;

rotating the first welding tip about the pin, wherein the pin locks the first welding tip to the first part and prevents the first welding tip from moving radially relative to the center axis of the first welding tip during the rotating step; and providing no electrical current to the first welding tip while increasing the force applied to the first part by the first welding tip and optionally rotating the first welding tip during a fourth period of time immediately following the third period of time.

2. The method of claim 1, wherein a cross-sectional area of said contact surface is greater than a cross-sectional area of said notch.

3. The method of claim 1, wherein said notch is located at an apex of said convex contact surface.

4. The method of claim 1, wherein said shaft is formed of conductive metal.

5. The method of claim 1, wherein the notch and the pin fix an axis of rotation of the first welding tip during the rotating step so that the center axis is the axis of rotation, and the notch and the pin prevent the first welding tip from moving radially relative to the fixed axis of rotation during the rotating step.

6. The method of claim 1, wherein at least one of the first part and the second part is formed of aluminum or an aluminum alloy.

7. The method of claim 1 including allowing the first part to cool while still contacting the first part with the first welding tip after the third period of time by applying no electrical current to the first welding tip; and rotating the first welding tip less than 360 degrees around the center axis of the first welding tip in a first direction and rotating the first welding tip less than 360 degrees around the center axis of the first welding tip in a second direction opposite the first direction while allowing the first part to cool and while contacting the first part with the first welding tip.

8. A method for spot welding parts formed of conductive metal, comprising the steps of:

providing a first part formed of conductive metal and a second part formed of conductive metal;

contacting the first part with a first welding tip while rotating the first welding tip around a center axis of the first welding tip, the first welding tip including a shaft extending to a distal end and presenting a notch at said distal end, and the shaft including contact surface extending radially outwardly from the notch;

contacting the second part with a second welding tip while contacting the first part with the first welding tip;

rotating the second welding tip around a center axis of the second welding tip while rotating the first welding tip around the center axis of the first welding tip, the second welding tip including a shaft extending to a distal end and presenting a contact surface around the distal end, and the shaft presenting a notch at the distal end;

applying no current to the second welding tip for a first period of time;

rotating the second welding tip before contacting the second part with the second welding tip during the first period of time; and applying force to the second part by the second welding tip during the first period of time.

9. The method of claim 8, wherein a cross-sectional area of the contact surface of the first welding tip extends upwardly from the notch to the perimeter surface, and the notch is located at an apex of the contact surface.

10. The method of claim 8, wherein the center axis of the first welding tip is aligned with the center axis of the second welding tip during the step of rotating the second welding tip around the center axis of the second welding tip while rotating the first welding tip around the center axis of the first welding tip.

* * * * *